(12) United States Patent
Clubb et al.

(10) Patent No.: US 10,121,217 B2
(45) Date of Patent: Nov. 6, 2018

(54) METHOD AND APPARATUS FOR PROCESSING UNCERTAIN TRANSACTION AMOUNTS IN A PAYMENT SYSTEM

(75) Inventors: Brian J. Clubb, O'Fallon, MO (US); Daniel M. Cohen, New York, NY (US); Sara E. Fiebiger, Ellisville, MO (US); Matthew L. Lanford, New York, NY (US); Jennifer W. Vanderwall, Wilton, CT (US); Alec S. Wilkins, Salt Lake City, UT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 2529 days.

(21) Appl. No.: 12/174,723

(22) Filed: Jul. 17, 2008

(65) Prior Publication Data

US 2010/0017235 A1 Jan. 21, 2010

(51) Int. Cl.
*G06Q 40/02* (2012.01)
*G06Q 50/22* (2018.01)
(Continued)

(52) U.S. Cl.
CPC .......... *G06Q 50/22* (2013.01); *G06Q 20/102* (2013.01); *G06Q 40/02* (2013.01); *G06Q 40/08* (2013.01)

(58) Field of Classification Search
CPC ..................................................... G06Q 20/32
(Continued)

(56) References Cited

U.S. PATENT DOCUMENTS 5,550,734 A 8/1996 Tarter et al.
5,803,500 A 9/1998 Mossberg
(Continued)

FOREIGN PATENT DOCUMENTS

WO WO 2004/006162 1/2004

OTHER PUBLICATIONS

First Data—Healthcare, http://www.firstdata.com/your_business/healthcare.htm.
(Continued)

*Primary Examiner* — Muriel S Tinkler
*Assistant Examiner* — John Anderson
(74) *Attorney, Agent, or Firm* — Otterstedt, Ellenbogen & Kammer, LLP

(57) ABSTRACT

A first acquirers receives, via a payment network configured to facilitate transactions between multiple issuers and multiple acquirers, an authorization response flagged with a flag. The flag indicates that clearing of a first transaction, associated with the authorization response, is to be suspended. The first transaction initially has an uncertain amount, and is associated with a first payment account, of a first user, associated with a first issuer. Subsequent determination of a final certain amount for the first transaction is awaited. Upon determination of the final certain amount, the first one of the acquirers proceeds with clearing the first transaction, based on the final certain amount. The steps are repeated for at least a second acquirer and at least a second transaction. The second transaction is associated with a second payment account, of a second user, associated with a second one of the issuers. The steps are carried out by an operator of the payment network, and the flag is understandable to the first and second issuers and the first and second acquirers.

25 Claims, 10 Drawing Sheets

(51) Int. Cl.
*G06Q 20/10* (2012.01)
*G06Q 40/08* (2012.01)

(58) Field of Classification Search
USPC .......................................................... 705/35
See application file for complete search history.

(56) References Cited

U.S. PATENT DOCUMENTS

| | | | |
|---|---|---|---|
| 6,343,271 B1 | 1/2002 | Peterson et al. | |
| 6,685,088 B1 | 2/2004 | Royer et al. | |
| 6,845,906 B2 | 1/2005 | Royer et al. | |
| 7,043,451 B2 | 5/2006 | Strayer et al. | |
| 7,076,465 B1 | 7/2006 | Blagg et al. | |
| 7,239,226 B2 | 7/2007 | Berardi et al. | |
| 7,249,112 B2 | 7/2007 | Berardi et al. | |
| 7,268,667 B2 | 9/2007 | Beenau et al. | |
| 7,343,344 B2 | 3/2008 | Tomoike | |
| 7,346,522 B1 | 3/2008 | Baylor et al. | |
| 7,370,018 B2 | 5/2008 | Bryant, Jr. et al. | |
| 2003/0069760 A1* | 4/2003 | Gelber ................... G06Q 40/02 705/4 |
| 2003/0200118 A1 | 10/2003 | Lee et al. | |
| 2004/0020982 A1 | 2/2004 | Hoffman et al. | |
| 2004/0148203 A1 | 7/2004 | Whitaker et al. | |
| 2005/0004921 A1 | 1/2005 | Beenan et al. | |
| 2005/0015280 A1 | 1/2005 | Gabel et al. | |
| 2005/0182660 A1* | 8/2005 | Henley ................. G06F 19/328 705/2 |
| 2005/0192895 A1 | 9/2005 | Rogers et al. | |
| 2005/0261968 A1 | 11/2005 | Randall et al. | |
| 2005/0288964 A1 | 12/2005 | Lutzen et al. | |
| 2006/0167720 A1 | 7/2006 | Harrison et al. | |
| 2007/0005402 A1 | 1/2007 | Kennedy et al. | |
| 2007/0005403 A1 | 1/2007 | Kennedy et al. | |
| 2007/0043595 A1 | 2/2007 | Pederson | |
| 2007/0078689 A1 | 4/2007 | Zubak et al. | |
| 2007/0106607 A1 | 5/2007 | Seib et al. | |
| 2007/0179813 A1 | 8/2007 | Darling | |
| 2007/0271119 A1 | 11/2007 | Boerger et al. | |
| 2008/0010096 A1* | 1/2008 | Patterson ............... G06F 19/328 705/4 |
| 2008/0140447 A1 | 6/2008 | Pourfallah et al. | |

OTHER PUBLICATIONS

ISO 8583—Wikipedia, http://en.wikipedia.org/wiki/ISO_8583.
American Express HealthPay Plus(SM) > HealthPay Plus Works for Employees, http://www152.americanexpress.com/entcampWeb/HealthPayEmp.jsp.

* cited by examiner

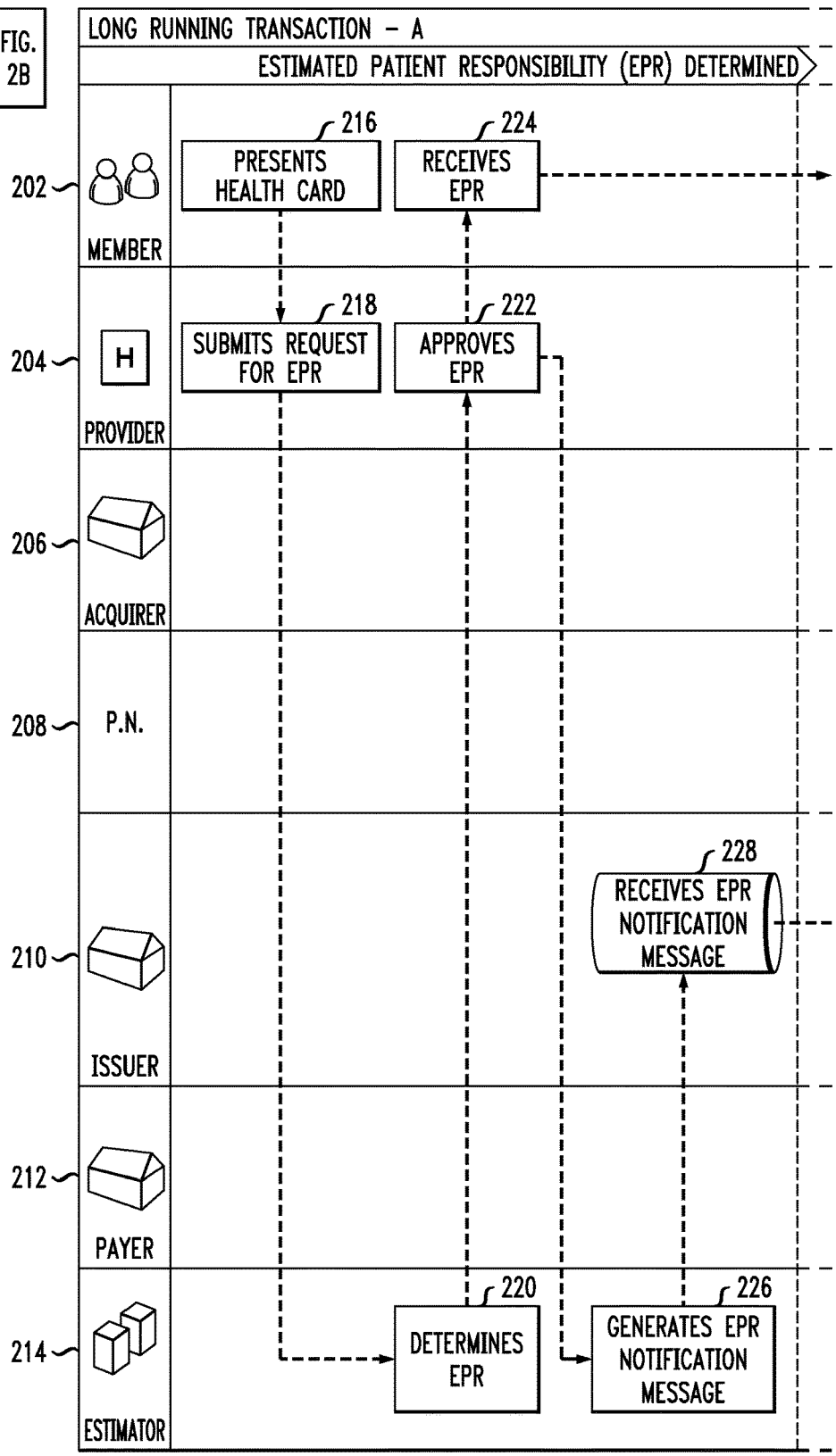

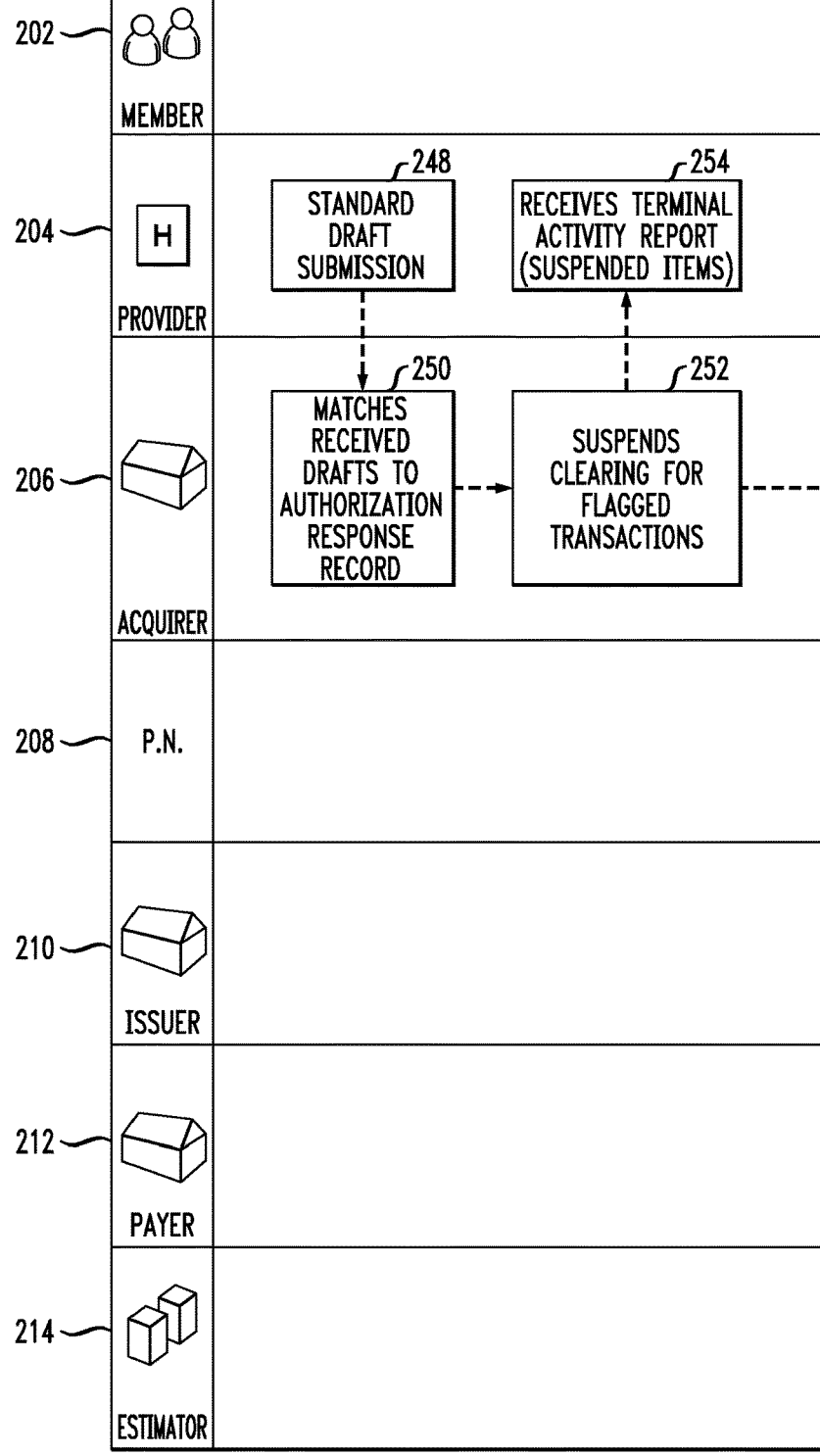

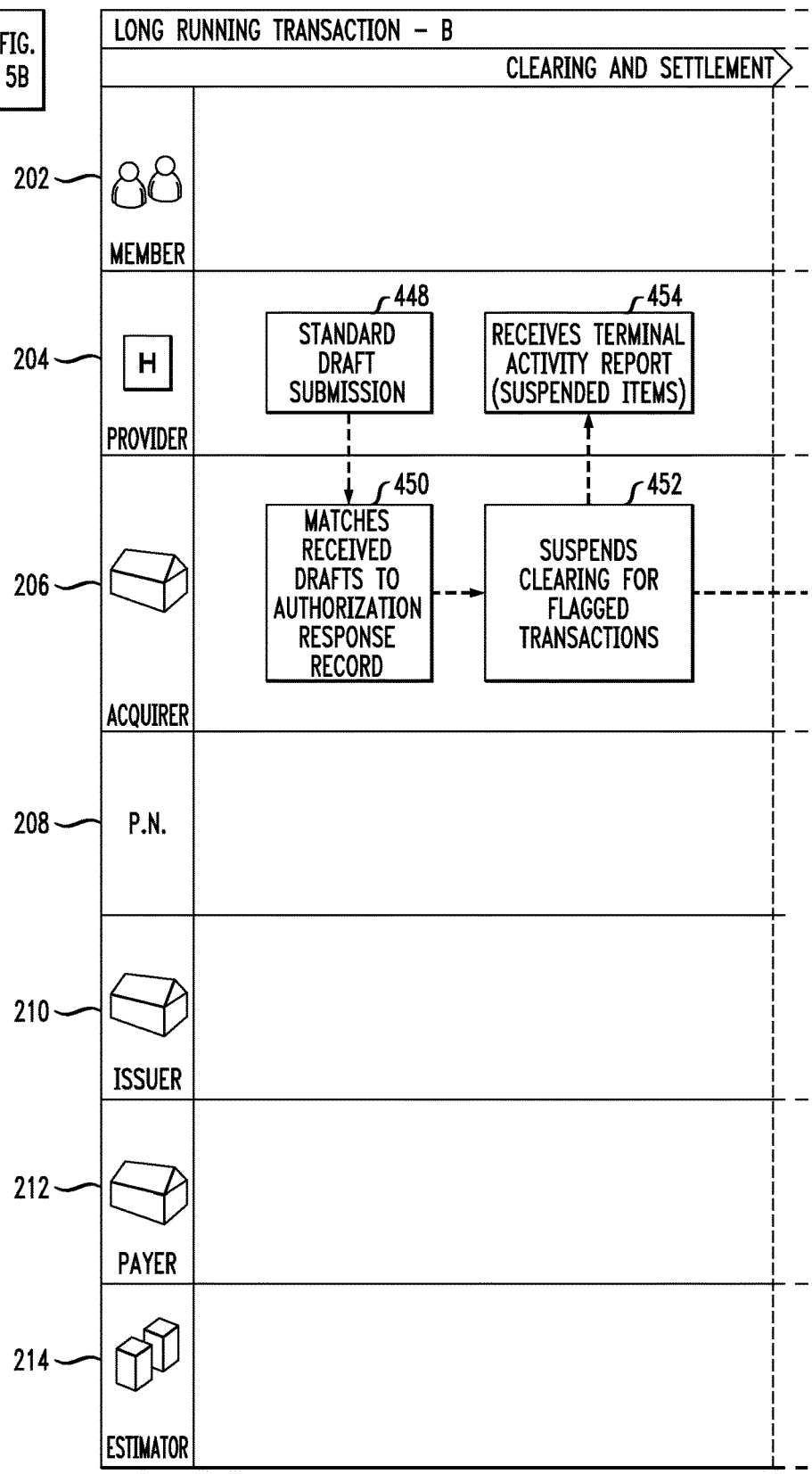

METHOD AND APPARATUS FOR PROCESSING UNCERTAIN TRANSACTION AMOUNTS IN A PAYMENT SYSTEM

FIELD OF THE INVENTION

The invention relates generally to electronic commerce, and more particularly, to electronic payment systems.

BACKGROUND OF THE INVENTION

Healthcare providers (e.g., hospitals, physician offices, and the like) provide products and/or services to patients. In many cases, the price is not pre-determined, and a third party must ascertain the price. Some providers will require that the consumer pay or secure funds on an estimate (e.g., estimated patient responsibility) at the point of service. The third party (e.g., estimator, health plan) will calculate the price after the products and/or services are provided, with the understanding that the currency secured via an estimate will need to be adjusted and settled at a later date once the price is finalized (e.g., medical claim is processed by the health plan).

In particular, consumer payments to healthcare providers are moving away from predictable fixed dollar co-payment amounts to unknown percentage-based amounts. This change is due to the shift away from co-pay based health insurance plans to co-insurance based plans, which pay a percentage of the negotiated rate (usually after a deductible). Under these plans, healthcare providers do not know what to charge patients at the time of checkout. Claims need to be processed by the health plan to determine the patients' financial responsibility. Doctors are unable to collect any funds up front and therefore must bill the patient later. These payments become more difficult to collect.

Because the final transaction amount is not known until after the claim has been adjudicated, and since the adjudication process can take a significant amount of time (up to, or even exceeding, ninety days), it is necessary to hold funds for this entire amount of time. Additionally, the final amount is determined by the payer and/or issuer (not the provider or acquirer), further complicating the transaction process.

SUMMARY OF THE INVENTION

Principles of the invention provide techniques for processing uncertain transaction amounts in a payment system. An exemplary embodiment of a method (which can be computer-implemented), according to one aspect of the invention, for processing uncertain transaction amounts in a payment network configured to facilitate transactions between multiple issuers and multiple acquirers, includes the step of facilitating a first one of the acquirers receiving, via the payment network configured to facilitate the transactions between the multiple issuers and the multiple acquirers, an authorization response flagged with a flag. The flag indicates that clearing of a first one of the transactions, associated with the authorization response, is to be suspended. The first transaction initially has an uncertain amount, and the first transaction is associated with a first payment account of a first user; the first payment account in turn is associated with a first one of the issuers. Other steps include awaiting subsequent determination of a final certain amount for the first transaction, and, upon determination of the final certain amount, facilitating the first one of the acquirers proceeding with clearing the first transaction, based on the final certain amount. The steps of facilitating the authorization response, awaiting the final certain amount, and facilitating the clearing, are repeated for at least a second one of the acquirers and at least a second one of the transactions. The second transaction is associated with a second payment account of a second user, and the second payment account is in turn associated with a second one of the issuers. The steps are carried out by an operator of the payment network configured to facilitate the transactions between the multiple issuers and the multiple acquirers, and the flag is understandable to the first and second issuers and the first and second acquirers.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention can provide substantial beneficial technical effects; for example, increased transactional efficiencies at the point of interaction and a reduction of post-service manual operations.

These and other features and advantages of the invention will become apparent from the following detailed description of illustrative embodiments thereof, which is to be read in connection with the accompanying drawings.

DETAILED DESCRIPTION OF PREFERRED EMBODIMENTS

One or more embodiments of the invention provide a system and method which secure payment assurance for healthcare providers (or other merchants) at the point of service, by providing a "long running transaction" (suspended clearing with delayed settlement), as well as integration with various third party constituents (e.g., health plans, third party administrators, estimators, and the like) to enable one or more of:

Interface with third party to obtain real-time estimated amount of consumer and/or third party responsibility for products and services purchased.

Recognize suspend clearing flag from issuer and pass to appropriate acquirer.

Recognize and pass additional information in transaction to aid in matching held and settled transactions (estimate vs. actual).

Clear and settle funds on actual patient responsibility via delayed and/or adjusted clearing and settlement.

Figure 1:
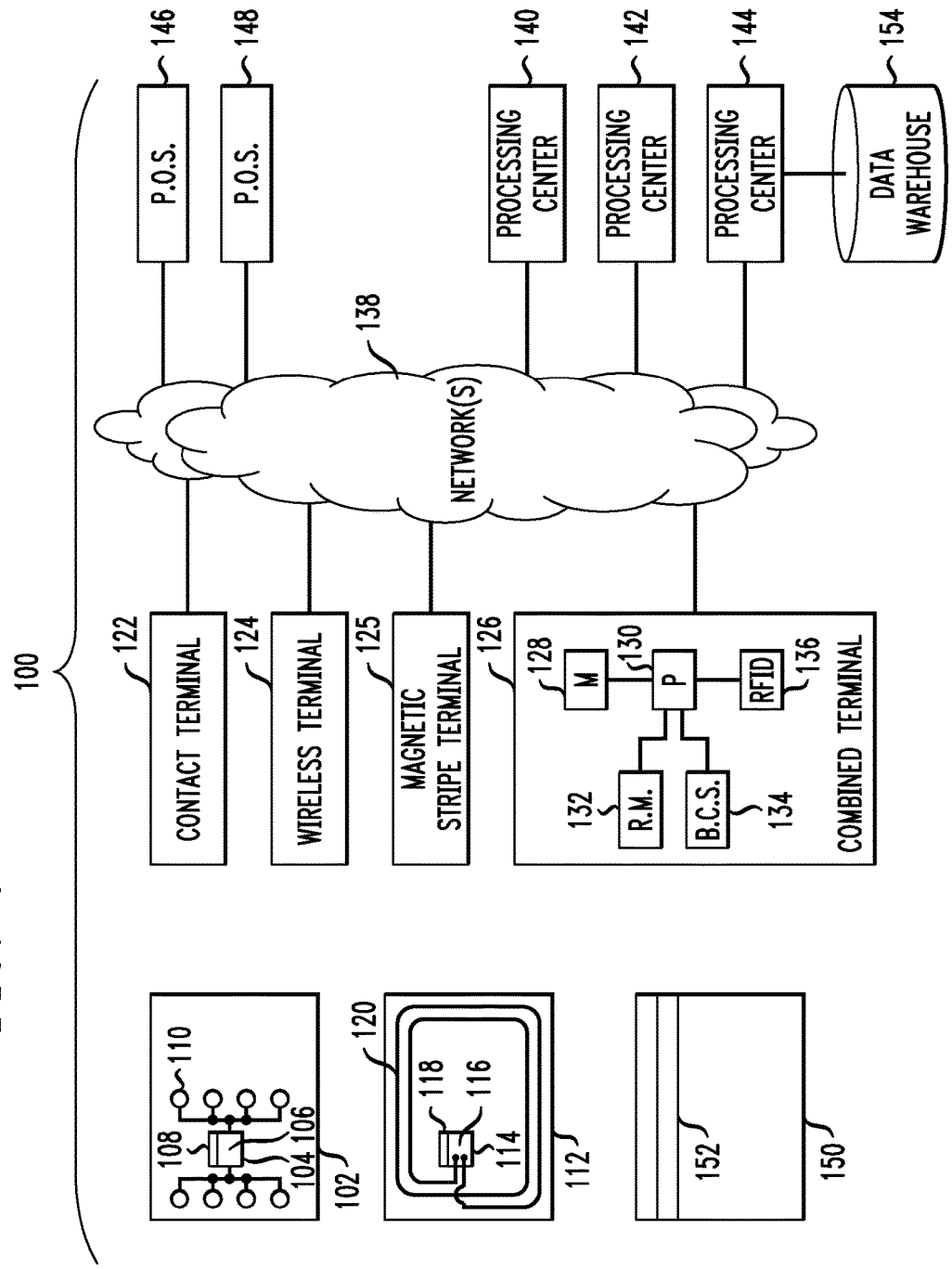
FIG. 1 shows an example of a system that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the invention. Other types of devices could include a conventional card 150 having a magnetic stripe 152, an appropriately configured cellular telephone handset, and the like. Indeed, techniques of the invention can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible standard to which such applications may conform is the EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in this sense is itself EMV-compliant. It will also be appreciated that applications in accordance with the invention can be configured in a variety of different ways.

In some instances, implementations may conform to appropriate healthcare payment card standards set forth by the Workgroup for Electronic Data Interchange, www.wedi.org. In some cases, implementations conform to pertinent ISO standards, such as ISO 8583. Individual entities or groups may develop specifications within this standard. Some messages (for example, authorization request and response) are defined within ISO 8583, while the flag mentioned below, given the teachings herein, may be implemented by the skilled artisan, for example, as part of a specification conforming to the ISO 8583 standard.

As noted, cards 102, 112 are examples of a variety of payment devices that can be employed with techniques of the invention. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe card can be employed.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® network (registered mark of MasterCard International Incorporated, Purchase, N.Y., USA). More than one network could be employed to connect different elements of the system. Processing centers 140, 142, 144 can include, for example, a host computer of an issuer of a payment device.

Many different retail or other establishments, represented by points-of-sale 146, 148, can be connected to network 138. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather data, such as a product identification, from a UPC code or RFID tag on a product to be purchased.

The above-described devices 102, 112 can be ISO 7816-compliant contact cards or devices or ISO 14443-compliant proximity cards or devices. In operation, card 112 can be touched or tapped on the terminal 124 or 126, which then contactlessly transmits the electronic data to the proximity IC chip in the card 112 or other wireless device. Magnetic stripe cards can be swiped in a well-known manner.

One or more of the processing centers 140, 142, 144 can include a database such as a data warehouse 154 for storing information of interest. In the context of one or more embodiments of the invention, such as those depicted in FIGS. 2-5, member 202 could hold a device such as 102, 122, 150; provider 204 could have a terminal such as 122, 124, 125, 126, and the entities 206, 208, 210, 212, 214 could operate processing centers such as 140, 142, 144 (with data storage 154 as needed). Network(s) 138 could, as noted, include a virtual private network (VPN) and/or the Internet; the VPN could be, for example, the aforementioned BANKNET® network, and entity 208 could be, for example, an entity such as MasterCard International Incorporated, Purchase, N.Y., USA.

In one or more embodiments, the acquirers, upon notification of the issuer (via the authorization response message), delay submitting the clearing message for those transactions which have been estimated, until they have received final notification from the issuer with the final amount.

In particular, the acquirer delays submitting clearing records for specific transactions (that have been identified by the issuer) until the acquirer receives notification of the final transaction amount. Acquirers are notified, in an authorization response message, that the associated clearing transaction is to be suspended. Acquirers do not submit the transaction into clearing until further notice.

When the final transaction amount is determined, as a result of the claim adjudication process, an adjudicated transaction file is submitted to the issuer and/or the operator of a network operating according to a payment system standard (and/or specification), such as MasterCard International Incorporated of Purchase, N.Y., USA, depending on the preferred process selected. This file is then sent to the acquirer(s) who have the matching suspended transactions. The acquirer(s) then update and submit the clearing records, releasing the final patient responsible amount.

Figure 2B:
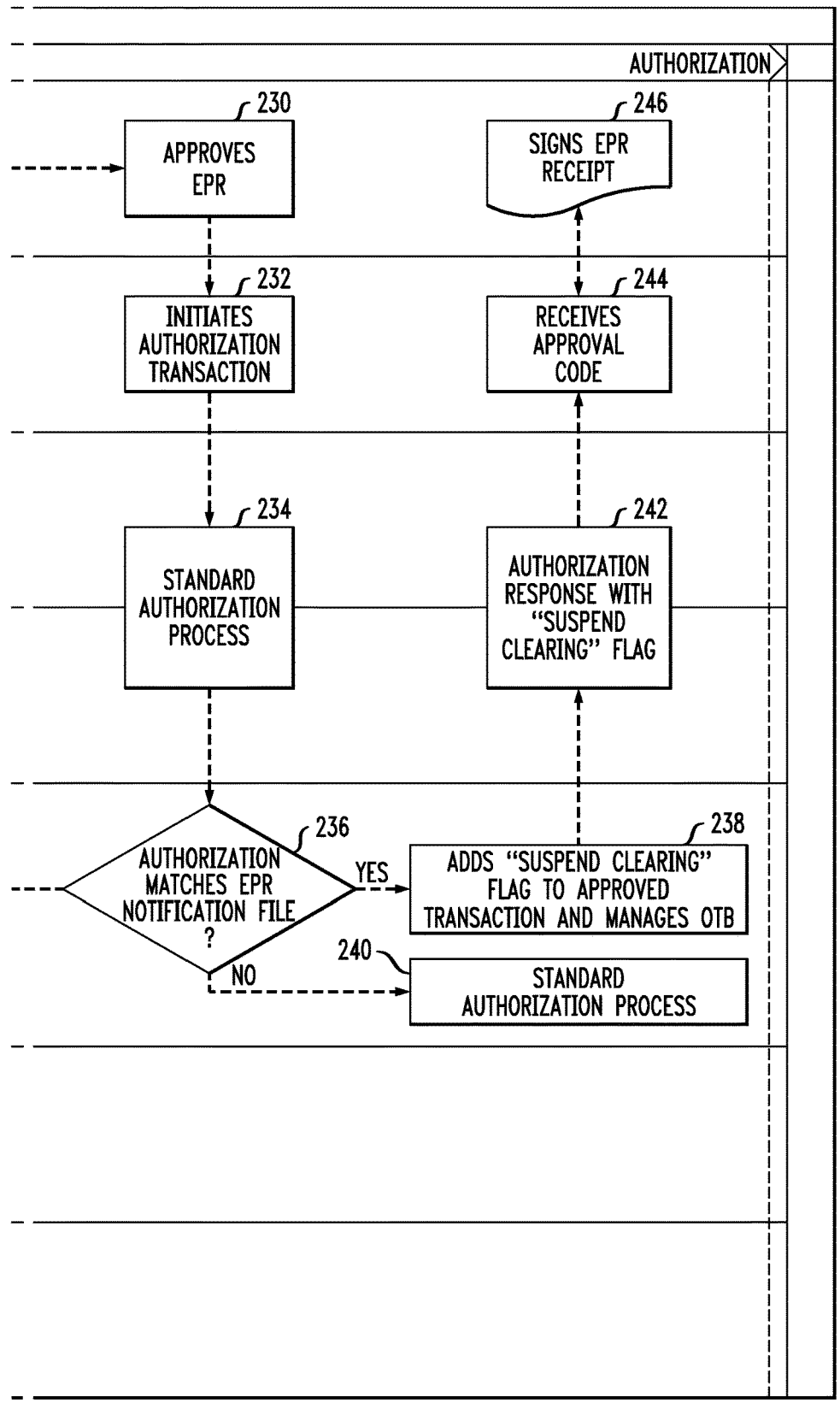
FIGS. 2-3 show a combined flow chart and block diagram, illustrative of data flow in a first exemplary embodiment of a method and system, according to an aspect of the invention.
Figure 3B:
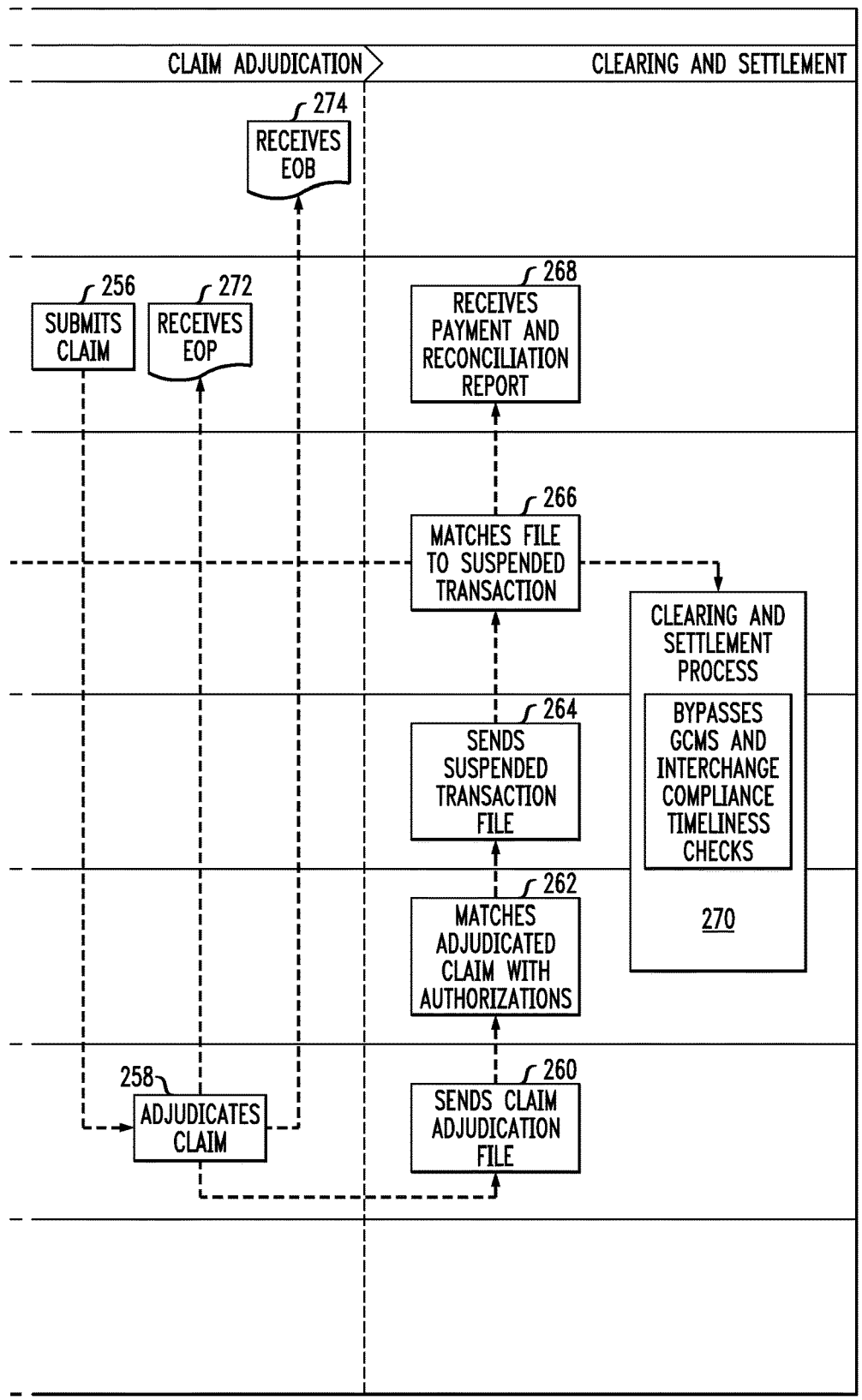

Attention should now be given to FIGS. 2-3, which present a flow chart of exemplary method steps, also functioning as a data flow diagram and block diagram, for a first exemplary embodiment. Entities of interest in the first exemplary embodiment include a member 202 (e.g., patient or person through whom the patient is insured, such as the parent or spouse of the patient) who has a co-insurance based health plan with an associated payment card. The patient receives treatment by participating provider 204. Additional entities include acquirer 206, an operator 208 of a payment network operating according to a payment system standard (or specification) (e.g., MasterCard International Incorporated of Purchase, N.Y., USA), an issuer 210, a payer 212, and an estimator 214. In general, estimator 214 could be run by the insurance company (payer 212) or another entity.

At block 216, the health card is presented to the provider by the member or his or her insured spouse or child. In block 218, provider 204 requests a payment estimate, using, for example, an estimation tool 214 (such as a web site). As indicated at block 220, estimation tool 214 estimates the payment (EPR—estimated patient responsibility), and advises the provider 204, who has the chance to approve at block 222. If the provider 222 approves the EPR, the member 202 is advised at block 224, and the estimator 214 generates an EPR notification message at block 226, which serves to directly notify issuer 210 of the estimation. Receipt by the issuer is indicated at block 228. Estimator 214 preferably notifies issuer 210 by sending a message in real-time. Issuer 210 maintains a record of the estimate that was sent. In one or more embodiments, notification from the estimator 214 to the issuer 210 is done outside of the payment network 208.

If member 202 approves the EPR, as at block 230, provider 204 initiates a standard purchase authorization message, at block 232, using the estimated amount obtained from the estimation tool 214. Issuer 210 receives the purchase authorization message via standard payment network techniques, as shown at block 234. In decision block 236, issuer 210 matches information in the authorization message with the estimation notification previously received and stored in block 228. In one or more embodiments, the minimum information on which the transaction is matched includes account (card) number and amount. In one or more embodiments, the issuer 210 employs a mapping table to map the payer member identifier (ID) received in the estimation notification block 228 to the corresponding account (card) number.

If the match is successful ("YES" branch of decision block 236), the issuer 210, in block 238, authorizes the transaction, turns on a "suspend clearing" flag in the authorization response message, and places a hold on applicable funds or reduces the available balance. In one or more embodiments, the flag is only turned on for approved transactions. The suspend clearing flag can be implemented, for example, as a new data field added to the "auth" and "auth response" and clearing messages, thus adding new data elements and/or flags to current payment network messages. In the event the match is not successful, as per the "NO" branch of decision block 236, the standard authorization process is followed as shown in block 240.

In the case where the matching is successful, the authorization response 242 includes the "suspend clearing" flag, the provider receives the approval code in block 244, and the member 202 signs the EPR receipt in block 246. Provider 204 typically balances his or her terminal and submits transactions, in batch, to the authorization acquirer normally, as shown in block 248. Authorization/clearing acquirer 206 processes non-suspended transactions normally, but suspends clearing for marked transactions, as shown at blocks 250 and 252. Authorization/clearing acquirer 206 pays provider 204 for non-suspended transactions only and submits clearing for those transactions to the payment network operator 208. For suspended items, the provider receives a terminal activity report at block 254.

As shown at block 256, provider 204 submits an insurance claim to payer 212 in a normal fashion. Payer 212 then adjudicates the claim, in block 258, and determines the final patient responsibility amount. Payer 212 sends the adjudicated claim data for the program to the issuer 210, as indicated by block 260. Issuer 210 matches the adjudicated claim with the held estimated authorization, in block 262. In one or more embodiments, issuer 210 translates the payer member ID to an account (card) number, and uses other transaction information, such as date, time, amount, merchant name, and the like, to match the claim information with the authorization. Issuer 210 sends a bulk file with the actual patient responsibility amount to the payment network operator 208. Network operator 208 creates and sends files for each acquirer 206, so that each acquirer 206 can initiate the clearing process, by matching the file to the suspended transaction(s), as in blocks 264 and 266. Provider 204 receives payment and a reconciliation report in block 268. Clearing acquirer 206 sends in the Global Clearing management System (GCMS) first presentment record with a unique interchange rate designator (IRD) and special interchange compliance, as indicated at block 270. The provider receives an explanation of payment in block 272 and the member receives an explanation of benefits in block 274. Note that there is typically only a single acquirer per transaction; however, systems and methods according to one or more embodiments of the invention can handle multiple transactions associated with multiple acquirers. Note also that GCMS is a platform, specific to MasterCard International Incorporated, which translates and processes inbound and outbound files from issuers and acquirers. Other platforms with similar functionality can be used as well, and GCMS is a non-limiting example. Given the teachings herein, the skilled artisan will be able to implement the appropriate functionality. With regard to block 270, note that in an ordinary transaction, interchange rates are enforced and transactions must clear and settle in a specified amount of time, for example, within three days of authorization; otherwise penalties are incurred. In one or more embodiments, because the final transaction amount is not yet known, the timeliness edits are bypassed, and the interchange rules are appropriately modified.

Figures 4, 4A:
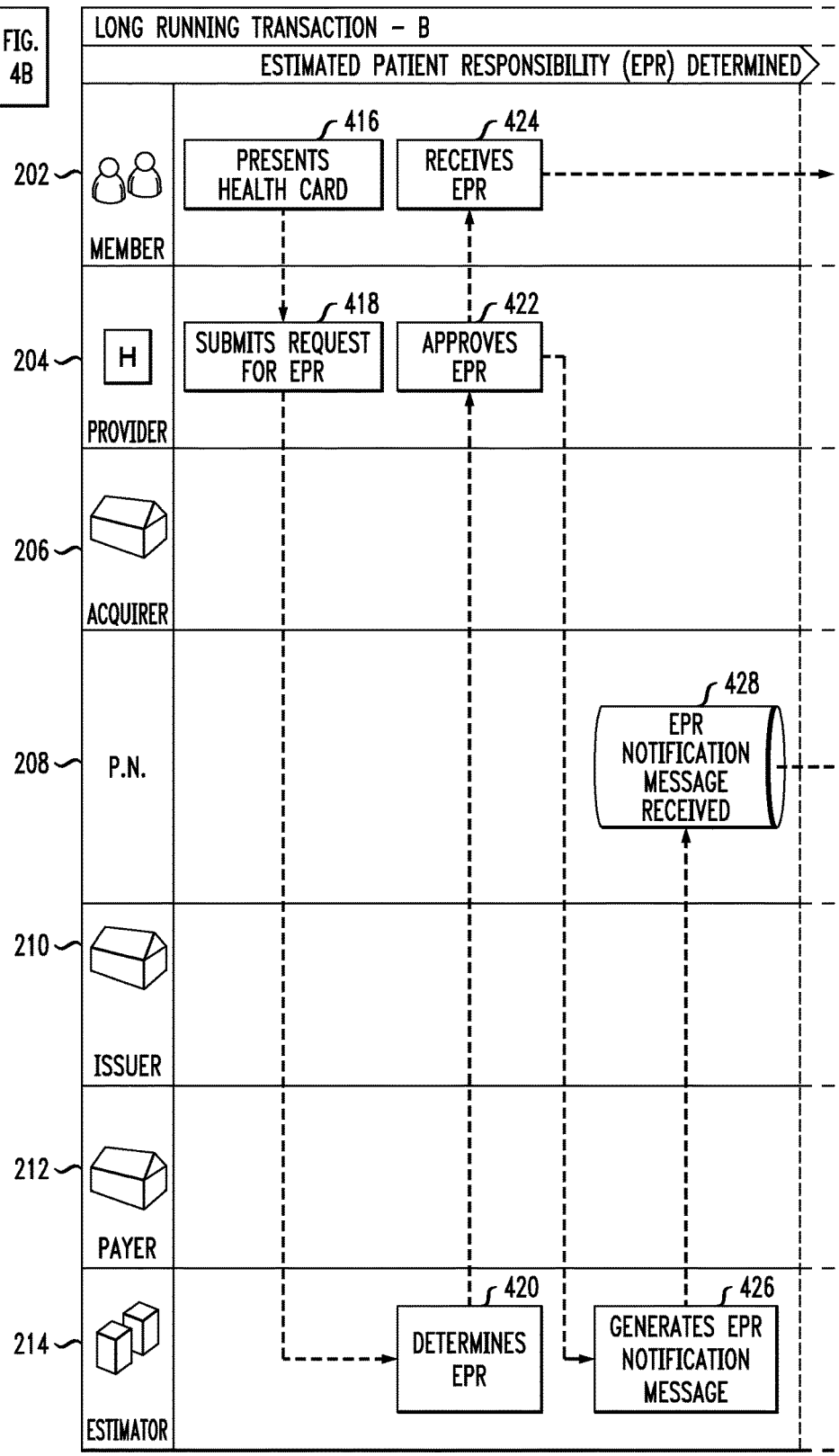
FIGS. 4-5 show a combined flow chart and block diagram, illustrative of data flow in a second exemplary embodiment of a method and system, according to another aspect of the invention.
Figure 4B:
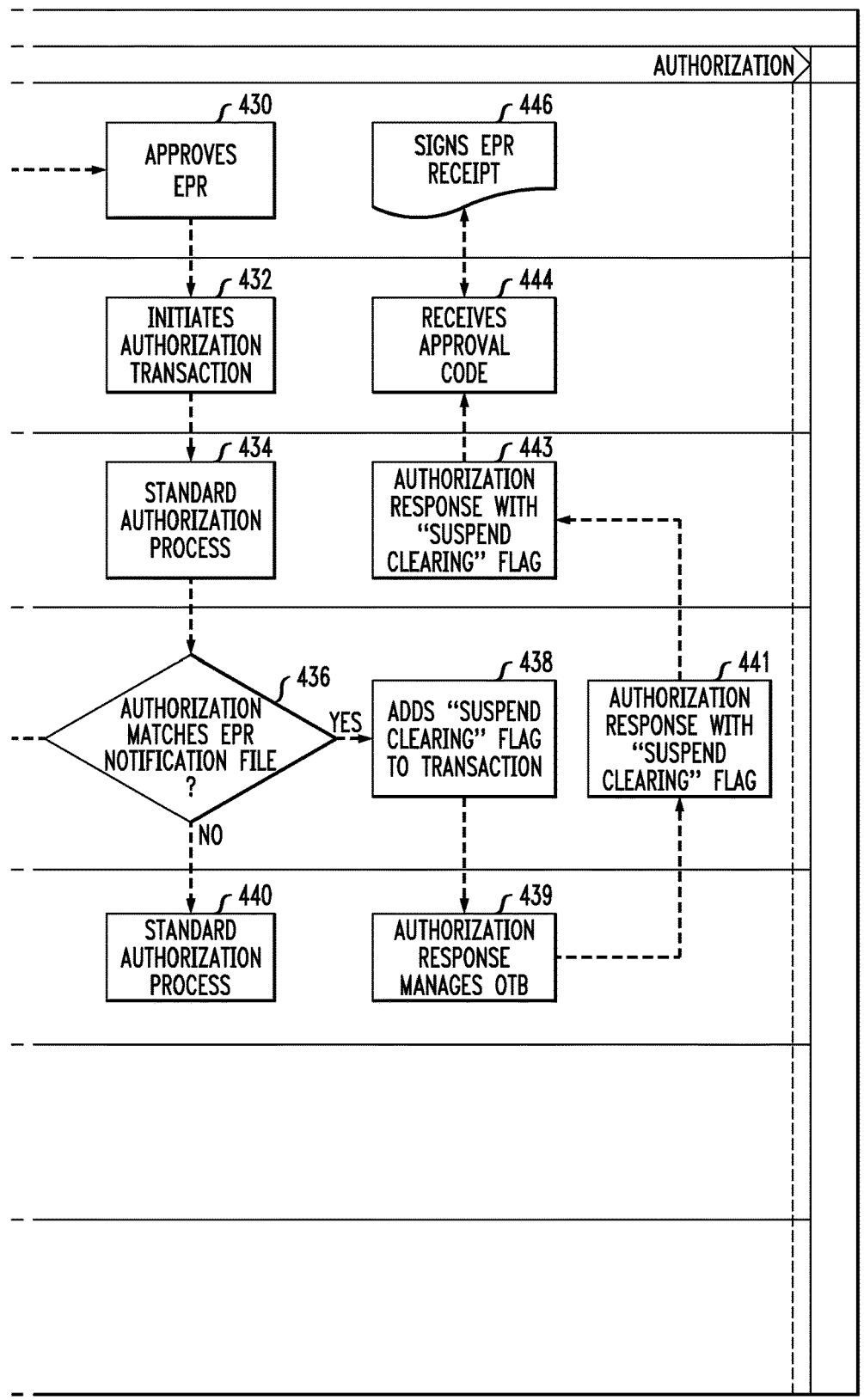
Figure 5B:
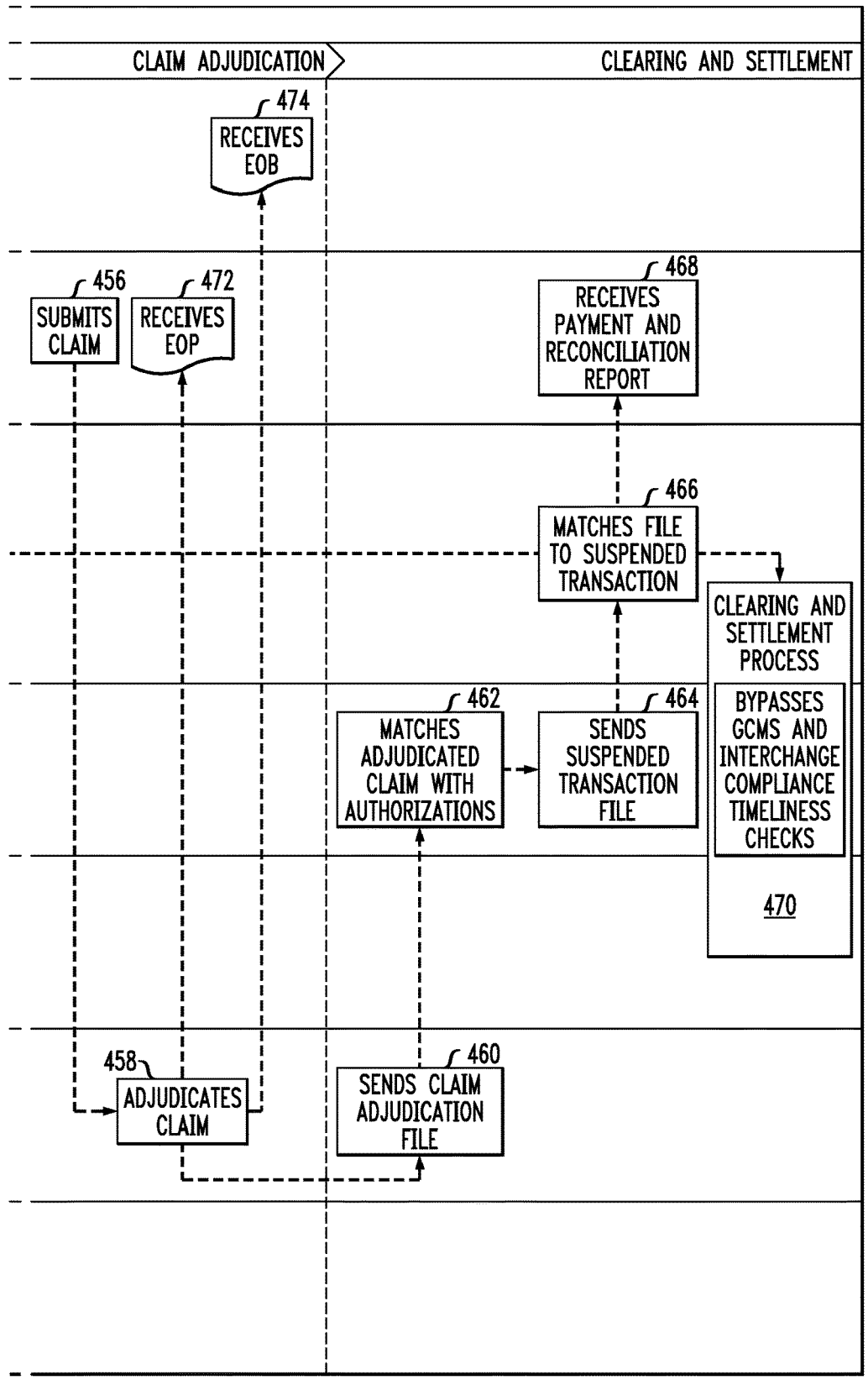

Attention should now be given to FIGS. 4-5, which present a flow chart of exemplary method steps, also functioning as a data flow diagram and block diagram, for a second exemplary embodiment, where the operator of the payment network 208 performs some functions that were performed by the issuer 210 in the first exemplary embodiment. Entities of interest in the exemplary embodiment are the same as in the first embodiment and have received the same reference characters. Blocks in FIGS. 4-5 analogous to those in FIGS. 2-3 have received the same reference character incremented by two hundred and will be described again only to the extent they differ from those in FIGS. 2-3. In the second embodiment, if the provider approves the EPR in block 422, the member 202 is advised at block 424, and the estimator 214 generates an EPR notification message at block 426, which serves to directly notify the operator of the payment network 208 of the estimation. Receipt by the operator 208 is indicated at block 428. Estimator 214 preferably notifies operator 208 by sending a message in real-time. Operator 208 maintains a record of the estimate that was sent. In one or more embodiments, notification from the estimator 214 to the operator 208 is done outside of the payment network, for example, over the Internet or via an electronic data interchange (EDI) layer.

If member 202 approves the EPR, as at block 430, provider 204 initiates a standard purchase authorization message, at block 432, using the estimated amount obtained from the estimation tool 214. Issuer 210 receives the purchase authorization message via standard payment network techniques, as shown at block 434. In decision block 436, operator 208 matches information in the authorization message with the estimation notification previously received and stored in block 428. In one or more embodiments, the minimum information on which the transaction is matched includes account (card) number and amount. In one or more embodiments, the operator 208 employs a mapping table to map the payer member identifier (ID) received in the estimation notification block 428 to the corresponding account (card) number. Note that regardless of who performs the matching, the translation table will typically be required to map Member ID to card number.

If the match is successful ("YES" branch of decision block 436), the operator 208, in block 438, turns on a "suspend clearing" flag before communicating with issuer 210, which prepares the authorization response message in block 439, and also manages the open to buy (OTB) or available balance. When the match is successful, any amount previously held for that specific transaction should be released. In one or more embodiments, the flag is only turned on for approved transactions, as shown in blocks 441 and 443, wherein an authorization response with the "suspend clearing" flag set is sent from issuer 210 to acquirer 206 via network 208. Note that in the embodiments of FIGS. 4 and 5, the "suspend clearing" flag can be implemented, for example, in the same manner as in the embodiment of FIGS. 2 and 3. In the event the match is not successful, as per the "NO" branch of decision block 436, the standard authorization process is followed as shown in block 440.

In the case where the matching is successful, the authorization response 441, 443 includes the "suspend clearing" flag, the provider receives the approval code in block 444 and the member 202 signs the EPR receipt in block 446

In the second embodiment, payer 212 adjudicates the claim, in block 458, and determines the final patient responsibility amount. Payer 212 sends the adjudicated claim data for the program to the operator 208, as indicated by block 460. Operator 208 matches the adjudicated claim with the held estimated authorization, in block 462. In one or more embodiments, operator 208 translates the payer member ID to an account (card) number, and uses other transaction information, such as date, time, amount, merchant name, and the like, to match the claim information with the authorization. Network operator 208 creates files for each acquirer 206, and sends same in block 464, so that each acquirer 206 can initiate the clearing process, by matching the file to the suspended transaction(s), as in block 466.

Embodiments of the invention may be particularly beneficial in the United States, due to changes in the health care industry, but may also be used cross industry and globally. Advantageously, in one or more embodiments of the invention, merchants (e.g., providers) can secure payment of an estimate at the point of service. Therefore, they do not need to resort to mechanisms such as card on file and/or post service billing.

In view of the specific examples above, it will be appreciated that, in general terms, one or more embodiments of the invention provide a method for processing uncertain transaction amounts in a payment network configured to facilitate transactions between multiple issuers and multiple acquirers. The method includes facilitating a first one of the acquirers 206 receiving, via the payment network (e.g., the network operated by entity 208), an authorization response (see blocks 242, 441, and 443) flagged with a flag. The flag indicates that clearing of a first one of the transactions associated with the authorization response, is to be suspended. The first transaction initially has an uncertain amount (for example, in an insurance plan where the patient-responsible balance is not known at the time the goods or services are provided to the patient). The first transaction is associated with a first payment account (for example, a card account) of a first user 202. The first payment account is, in turn, associated with a first one of the issuers 210.

An additional step includes awaiting subsequent determination of a final certain amount, for example, an adjudicated amount, for the first transaction (for example, by payer 212, as in blocks 258, 458). Upon determination of the final certain amount, a further step includes facilitating the first one of the acquirers 206 proceeding with clearing the first transaction, based on the final certain amount, as at blocks 270, 470.

The steps of facilitating the authorization response, awaiting the final certain amount, and facilitating the clearing are repeated for one or more additional acquirers, and for one or more additional transactions, associated with one or more additional payment accounts of one or more additional one of the issuers. The steps are carried out by the operator 208 of the network (recalling the definition of facilitating herein). The flag is understandable to the issuers and acquirers that are involved with the suspended clearing transactions.

An additional step that can be performed includes facilitating an intermediate party (i) obtaining a notification message pertaining to the first transaction from the third party estimator 214 (blocks 228, 428), and (ii) storing transaction data (e.g., the above-mentioned record of the estimate that was sent) associated with the notification message. The intermediate party can be, for example, the operator of the payment system 208, or the issuer 210 (of the card or other payment device associated with the first transaction). Further additional steps include facilitating the intermediate party obtaining an authorization request pertaining to the first transaction, as at blocks 234, 434, from a merchant associated with the first transaction (e.g., provider 204), and facilitating the intermediate party matching the authorization request against the notification message (blocks 236, 436), and, if the authorization request matches the notification message, facilitating flagging the authorization response for suspended clearing, with the flag (blocks 238, 438). Of course, this additional step can be repeated for additional entities and transactions.

As noted, in some instances, the merchant is a health care provider 204. An additional step that can be carried out includes facilitating submission of an insurance claim (blocks 256, 456) from the provider 204 to a third party payer 212. The insurance claim provides the basis for the aforementioned final certain (e.g., adjudicated) amount. Further steps include facilitating transmission of claim data associated with the insurance claim and the adjudicated amount from the third party payer 212 to the intermediate party 208 or 210, as at blocks 260, 460; facilitating comparison of the claim data with the stored transaction data, as at blocks 262, 462; and, if the comparison of the claim data with the stored transaction data is affirmative (matching successful at 262, 462), facilitating the intermediate party 208 or 210 communicating with the first acquirer 206 to effectuate the clearing of the first transaction, for example, as at blocks 264, 266, 268, and 270 in FIG. 3 or 464, 466, 468, 470 in FIG. 5. Again, this additional step can be repeated for additional entities and transactions.

As noted elsewhere, in some instances, the notification message 228, 248, from the third party estimator 214, is sent to the intermediate party 208 or 210 by a communications link other than the payment network, for example, via the Internet or an EDI layer. Note also, the third party estimator 214 could be associated with payer 212, or independent of payer 212. Further, note that the one or more of the transactions could be related to health care, an online auction, or the like.

It should be noted that one or more inventive techniques can be employed for situations other than the specific embodiments discussed herein. For example, the initial amount could be based on something other than an estimated patient-responsible amount, such as a maximum possible amount or a fixed amount. Further, techniques set forth herein could be useful in scenarios other than healthcare, and with merchants other than healthcare providers, whenever the actual transaction amount was uncertain until some later time. Thus, providers 204 are illustrative of a variety of merchants, and adjudication 258, 458 is typical of a variety of scenarios where an initially uncertain transaction amount later becomes a final, certain amount. Another exemplary non-limiting application is the field of online auctions; but again, one or more techniques of the invention may be applicable wherever the transaction amount is not known at the point of sale, and authorization is required up front but the amount owed is not yet known.

Aspects of the invention thus provide an open solution, including messaging and associated rules, wherein a plurality of different estimation engines (for example, many different entities 214) can work across the network 208— any transaction, which can typically be determined externally (i.e., outside network 208), can inherit the flag and be processed as a long-running transaction (suspended clearing). One or more embodiments of the invention can include a product or service provided to various and disparate banks or similar financial institutions, even competitors, to enable them to communicate the length of time (period) a hold should occur, across the network. The length may be predetermined, for example, by agreement among participating financial institutions. The flag communicates, at the time of the transaction, the need to apply the hold value. Embodiments of the invention, as noted, bypass timeliness checks and adjusting interchange (blocks 270 and 470).

Figure 6:
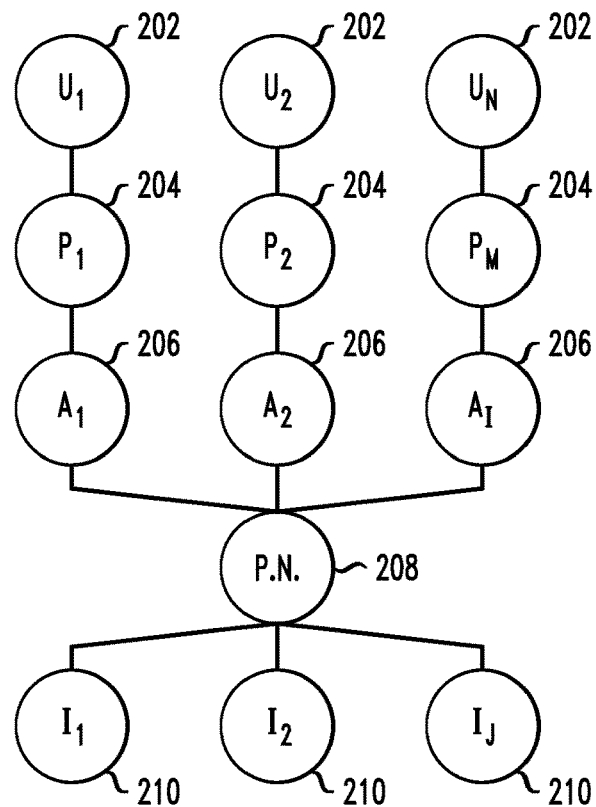
FIG. 6 depicts an exemplary inter-relationship between and among: (i) a payment network configured to facilitate transactions between multiple issuers and multiple acquirers, (ii) a plurality of users, (iii) a plurality of providers or other merchants, (iv) a plurality of acquirers, and (v) a plurality of issuers.

With reference to FIG. 6, an exemplary relationship among multiple entities is depicted. A number of different users 202, $U_1, U_2 \ldots U_N$, interact with a number of different merchants 204, $P_1, P_2 \ldots P_M$. In general, users 202 could be members, patients, or other customers (for example, people participating in an on-line auction), while merchants 204 could be providers or other merchants. Merchants 204 interact with a number of different acquirers 206, $A_1, P_2 \ldots A_I$. Acquirers 206 interact with a number of different issuers 210, $I_1, I_2 \ldots I_J$, through a single operator 208 of a payment network configured to facilitate transactions between multiple issuers and multiple acquirers; for example, MasterCard International Incorporated, operator of the above-mentioned BANKNET® network, or Visa International Service Association, operator of the VISANET® network. In general, N, M, I, and J are integers that can be equal or not equal.

System and Article of Manufacture Details

The invention can employ hardware and/or software aspects. Software includes but is not limited to firmware, resident software, microcode, etc. Software might be employed, for example, in connection with one or more of a terminal 122, 124, 125, 126; a processing center 140, 142, 144 (optionally with data warehouse 154) of a merchant, issuer, acquirer, processor, payment processing network operator, other entity as depicted in blocks 202-214 of FIGS. 2-5; and the like. Firmware might be employed, for example, in connection with payment devices such as cards 102, 112.

Figure 7:
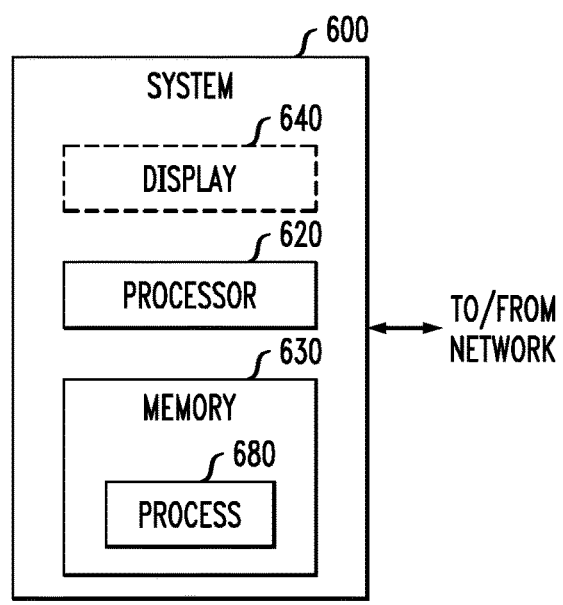
FIG. 7 is a block diagram of an exemplary computer system useful in one or more embodiments of the invention.

FIG. 7 is a block diagram of a system 600 that can implement part or all of one or more aspects or processes of the invention. As shown in FIG. 7, memory 630 configures the processor 620 (which could correspond, e.g., to processor portions 106, 116, 130, processors of remote hosts in centers 140, 142, 144, or processors associated with any entities as depicted in blocks 202-214 of FIGS. 2-5, and the like) to implement one or more aspects of the methods, steps, and functions disclosed herein (collectively, shown as process 680 in FIG. 7). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices.

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, processors associated with any entities as depicted in blocks 202-214 of FIGS. 2-5, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, the aforementioned terminals 122, 124, 125, 126; processing centers 140, 142, 144 with data warehouse 154; processors associated with any entities as depicted in blocks 202-214 of FIGS. 2-5; and the like, or payment devices such as cards 102, 112; can make use of computer technology with appropriate instructions to implement method steps described herein. By way of further example, a terminal apparatus 122, 124, 125, 126 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe).

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the invention can include a computer comprising code adapted to cause the computer to carry out one or more steps of methods or claims set forth herein, together with one or more apparatus elements or features as depicted and described herein.

Thus, aspects of the invention can be implemented, for example, by one or more appropriately programmed general purpose computers, such as, for example, servers or personal computers, located at one or more of the locations 204, 206, 210, 212, 214, as well as within network 208. Such computers can be interconnected, for example, by one or more of payment network 208, another VPN, the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts of FIGS. 2-5.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for processing uncertain transaction amounts in an ISO 8583 payment network configured to facilitate transactions between multiple issuers and multiple acquirers, said method comprising the steps of:
   providing an open solution architecture by connecting at least first and second different external estimation engines with said ISO 8583 payment network configured to facilitate said transactions between said multiple issuers and said multiple acquirers;
   facilitating a first one of said acquirers receiving, via said ISO 8583 payment network configured to facilitate said transactions between said multiple issuers and said multiple acquirers, an ISO 8583 authorization response flagged with a flag, said flag indicating that clearing of a first one of said transactions, associated with said ISO 8583 authorization response, is to be suspended, said first transaction initially having an uncertain amount, said first transaction being associated with a first payment account of a first user, said first payment account being associated with a first one of said issuers, said first transaction being flagged responsive to a notification message from said first external estimation engine;
   awaiting subsequent determination of a final certain amount for said first transaction;
   upon determination of said final certain amount, facilitating said first one of said acquirers proceeding with clearing said first transaction, based on said final certain amount; and
   repeating said steps of facilitating said ISO 8583 authorization response, awaiting said final certain amount, and facilitating said clearing, for:
     at least a second one of said acquirers, and
     at least a second one of said transactions, associated with a second payment account of a second user, said second payment account in turn being associated with a second one of said issuers, said second transaction being flagged responsive to a notification message from said second external estimation engine;
   wherein:
   said steps are carried out by an operator of said ISO 8583 payment network configured to facilitate said transactions between said multiple issuers and said multiple acquirers;
   said flag is understandable to said first and second issuers and said first and second acquirers, to facilitate said open solution architecture; and
   said ISO 8583 payment network configured to facilitate said transactions between said multiple issuers and said multiple acquirers is configured with timeliness checks requiring clearing completion within a predetermined time after authorization;
   further comprising bypassing said timeliness checks of said ISO 8583 payment network to permit said clearing, responsive to said flagging.

2. The method of claim 1, further comprising the additional steps of:
   facilitating an intermediate party (i) obtaining a notification message, from a third party estimator that operates one of said first and second estimation engines, said notification message pertaining to said first transaction, and (ii) storing transaction data associated with said notification message;
   facilitating said intermediate party obtaining an authorization request, from a merchant associated with said first transaction, pertaining to said transaction; and
   facilitating said intermediate party matching said authorization request against said notification message, and, if said authorization request matches said notification message, facilitating flagging said authorization response for suspended clearing, with said flag.

3. The method of claim 2, wherein said merchant comprises a health care provider, further comprising the additional steps of:
   facilitating submission of an insurance claim from said provider to a third party payer, said insurance claim providing a basis for said final certain amount;
   facilitating transmission of claim data associated with said insurance claim and said adjudicated amount from said third party payer to said intermediate party;

facilitating comparison of said claim data with said stored transaction data; and if said comparison of said claim data with said stored transaction data is affirmative, facilitating said intermediate party communicating with said first acquirer to effectuate said clearing of said first transaction.

4. The method of claim 3, wherein said intermediate party comprises an operator of said payment system.

5. The method of claim 3, wherein said intermediate party comprises said first issuer.

6. The method of claim 5, wherein said notification message, from said third party estimator, is sent to said intermediate party by a communications link other than said payment network.

7. The method of claim 3, wherein said third party estimator is associated with said third party payer.

8. The method of claim 3, wherein said third party estimator is independent of said third party payer.

9. A system for processing uncertain transaction amounts in an ISO 8583 payment network configured to facilitate transactions between multiple issuers and multiple acquirers, said system comprising:
a memory; and
at least one processor, coupled to said memory, located at an intermediate node in said ISO 8583 payment network configured to facilitate said transactions between said multiple issuers and said multiple acquirers, and operative to:
facilitate providing an open solution architecture by connecting at least first and second different external estimation engines with said ISO 8583 payment network configured to facilitate said transactions between said multiple issuers and said multiple acquirers;
facilitate a first one of said acquirers receiving, via said ISO 8583 payment network configured to facilitate said transactions between said multiple issuers and said multiple acquirers, an ISO 8583 authorization response flagged with a flag, said flag indicating that clearing of a first one of said transactions, associated with said authorization response, is to be suspended, said first transaction initially having an uncertain amount, said first transaction being associated with a first payment account of a first user, said first payment account being associated with a first one of said issuers, said first transaction being flagged responsive to a notification message from said first external estimation engine;
await subsequent determination of a final certain amount for said first transaction;
upon determination of said final certain amount, facilitate said first one of said acquirers proceeding with clearing said first transaction, based on said final certain amount; and
repeat said steps of facilitating said ISO 8583 authorization response, awaiting said final certain amount, and facilitating said clearing, for:
at least a second one of said acquirers, and
at least a second one of said transactions, associated with a second payment account of a second user, said second payment account in turn being associated with a second one of said issuers, said second transaction being flagged responsive to a notification message from said second external estimation engine;

wherein;
said first and second issuers are interconnected with said first and second acquirers by said ISO 8583 payment network configured to facilitate said transactions between said multiple issuers and said multiple acquirers;
said flag is understandable to said first and second issuers and said first and second acquirers, to facilitate said open solution architecture; and
said ISO 8583 payment network configured to facilitate said transactions between said multiple issuers and said multiple acquirers is configured with timeliness checks requiring clearing completion within a predetermined time after authorization;
wherein said at least one processor is further operative to bypass said timeliness checks of said ISO 8583 payment network to permit said clearing, responsive to said flagging.

10. The system of claim 9, wherein said processor is further operative to:
facilitate an intermediate party (i) obtaining a notification message, from a third party estimator that operates one of said first and second estimation engines, said notification message pertaining to said first transaction, and (ii) storing transaction data associated with said notification message;
facilitate said intermediate party obtaining an authorization request, from a merchant associated with said first transaction, pertaining to said transaction; and
facilitate said intermediate party matching said authorization request against said notification message, and, if said authorization request matches said notification message, facilitate flagging said authorization response for suspended clearing, with said flag.

11. The system of claim 10, wherein said merchant comprises a health care provider, wherein said processor is further operative to:
facilitate submission of an insurance claim from said provider to a third party payer, said insurance claim providing a basis for said final certain amount;
facilitate transmission of claim data associated with said insurance claim and said adjudicated amount from said third party payer to said intermediate party;
facilitate comparison of said claim data with said stored transaction data; and
if said comparison of said claim data with said stored transaction data is affirmative, facilitate said intermediate party communicating with said first acquirer to effectuate said clearing of said first transaction.

12. The system of claim 11, wherein said intermediate party comprises an operator of said payment system.

13. The system of claim 11, wherein said intermediate party comprises said first issuer.

14. The system of claim 13, wherein said notification message, from said third party estimator, is sent to said intermediate party by a communications link other than said payment network.

15. The system of claim 11, wherein said third party estimator is associated with said third party payer.

16. The system of claim 11, wherein said third party estimator is independent of said third party payer.

17. The method of claim 1, further comprising providing a system, wherein the system comprises distinct software modules, each of the distinct software modules being embodied in a non-transitory manner on a tangible computer-readable recordable storage medium, and wherein the distinct software modules comprise a first module, a second module, a third module, and a fourth module;

wherein:
said facilitating of said first one of said acquirers receiving said authorization response is carried out by said first module executing on at least one hardware processor;
said awaiting of said subsequent determination is facilitated by said second module executing on said at least one hardware processor;
said facilitating of proceeding with said clearing is carried out by said third module executing on said at least one hardware processor; and
said repeating is facilitated by said fourth module executing on said at least one hardware processor.

18. A non-transitory computer readable medium comprising computer executable instructions which when executed by a computer cause the computer to perform a method of processing uncertain transaction amounts in an ISO 8583 payment network configured to facilitate transactions between multiple issuers and multiple acquirers, said method comprising the steps of:
facilitating providing an open solution architecture by connecting at least first and second different external estimation engines with said ISO 8583 payment network configured to facilitate said transactions between said multiple issuers and said multiple acquirers;
facilitating a first one of said acquirers receiving, via said ISO 8583 payment network configured to facilitate said transactions between said multiple issuers and said multiple acquirers, an ISO 8583 authorization response flagged with a flag, said flag indicating that clearing of a first one of said transactions, associated with said ISO 8583 authorization response, is to be suspended, said first transaction initially having an uncertain amount, said first transaction being associated with a first payment account of a first user, said first payment account being associated with a first one of said issuers, said first transaction being flagged responsive to a notification message from said first external estimation engine;
facilitating awaiting subsequent determination of a final certain amount for said first transaction;
upon determination of said final certain amount, facilitating said first one of said acquirers proceeding with clearing said first transaction, based on said final certain amount; and
repeating said steps of facilitating said ISO 8583 authorization response, facilitating awaiting said final certain amount, and facilitating said clearing, for:
at least a second one of said acquirers, and
at least a second one of said transactions, associated with a second payment account of a second user, said second payment account in turn being associated with a second one of said issuers, said second transaction being flagged responsive to a notification message from said second external estimation engine;
wherein:
said steps are carried out by an operator of said ISO 8583 payment network configured to facilitate said transactions between said multiple issuers and said multiple acquirers;
said flag is understandable to said first and second issuers and said first and second acquirers, to facilitate said open solution architecture; and said ISO 8583 payment network configured to facilitate said transactions between said multiple issuers and said multiple acquirers is configured with timeliness checks requiring clearing completion within a predetermined time after authorization;
said method further comprising bypassing said timeliness checks of said ISO 8583 payment network to permit said clearing, responsive to said flagging.

19. The non-transitory computer readable medium of claim 18, wherein the computer executable instructions, when executed by the computer, further cause the computer to perform the additional method steps of:
facilitating an intermediate party (i) obtaining a notification message, from a third party estimator, that operates one of said first and second estimation engines, said notification message pertaining to said first transaction, and (ii) storing transaction data associated with said notification message;
facilitating said intermediate party obtaining an authorization request, from a merchant associated with said first transaction, pertaining to said transaction; and
facilitating said intermediate party matching said authorization request against said notification message, and, if said authorization request matches said notification message, facilitate flagging said authorization response for suspended clearing, with said flag.

20. The non-transitory computer readable medium of claim 19, wherein said merchant comprises a health care provider, wherein the computer executable instructions, when executed by the computer, further cause the computer to perform the additional method steps of:
facilitating submission of an insurance claim from said provider to a third party payer, said insurance claim providing a basis for said final certain amount;
facilitating transmission of claim data associated with said insurance claim and said adjudicated amount from said third party payer to said intermediate party;
facilitating comparison of said claim data with said stored transaction data; and
if said comparison of said claim data with said stored transaction data is affirmative, facilitating said intermediate party communicating with said first acquirer to effectuate said clearing of said first transaction.

21. The non-transitory computer readable medium of claim 20, wherein said intermediate party comprises an operator of said payment system.

22. The non-transitory computer readable medium of claim 20, wherein said intermediate party comprises said first issuer.

23. The non-transitory computer readable medium of claim 22, wherein said notification message, from said third party estimator, is sent to said intermediate party by a communications link other than said payment network.

24. The non-transitory computer readable medium of claim 20, wherein said third party estimator is associated with said third party payer.

25. The non-transitory computer readable medium of claim 20, wherein said third party estimator is independent of said third party payer.

* * * * *